United States Patent
Kakumu

(10) Patent No.: US 9,770,803 B2
(45) Date of Patent: Sep. 26, 2017

(54) COOLANT NOZZLE HAVING FUNCTION OF AUTOMATICALLY ELIMINATING CLOGGING BY FOREIGN MATTER

(71) Applicant: FANUC Corporation, Yamanashi (JP)

(72) Inventor: Masahiro Kakumu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 173 days.

(21) Appl. No.: 14/872,700

(22) Filed: Oct. 1, 2015

(65) Prior Publication Data
US 2016/0096187 A1    Apr. 7, 2016

(30) Foreign Application Priority Data
Oct. 3, 2014    (JP) .................. 2014-204595

(51) Int. Cl.
| B05B 15/02 | (2006.01) |
| --- | --- |
| B24B 55/02 | (2006.01) |
| B05B 15/00 | (2006.01) |
| B05B 12/08 | (2006.01) |
| B05B 1/00 | (2006.01) |
| B05B 1/30 | (2006.01) |
| B23B 27/10 | (2006.01) |
| B23Q 11/10 | (2006.01) |

(52) U.S. Cl.
CPC ............ B24B 55/02 (2013.01); B05B 1/00 (2013.01); B05B 1/3006 (2013.01); B05B 12/085 (2013.01); B05B 15/008 (2013.01); B05B 15/02 (2013.01); B05B 15/0208 (2013.01); B05B 15/0216 (2013.01); B05B 15/0225 (2013.01); B05B 15/0233 (2013.01); B23B 27/10 (2013.01); B23Q 11/1076 (2013.01); Y10S 239/12 (2013.01); Y10S 239/19 (2013.01)

(58) Field of Classification Search
CPC . B05B 15/0225; B05B 15/02; B05B 15/0208; B05B 1/3006; B05B 15/0216; B05B 15/0233; B05B 12/085; B05B 1/00; B05B 15/008; B24B 55/02; B23Q 11/1076; B23B 27/10; Y10S 239/12; Y10S 239/19
USPC ... 239/71, 73, 104, 106, 114, 115, 116, 117, 239/118, 123, 570, 571, 589, 590, 602, 239/DIG. 12, DIG. 19; 407/11
See application file for complete search history.

(56) References Cited

U.S. PATENT DOCUMENTS

| 4,480,789 A * | 11/1984 | Kemper | ................ B05B 1/3006 239/116 |
| --- | --- | --- | --- |
| 5,119,991 A * | 6/1992 | Divers | ................ B05B 15/0233 239/117 |
| 5,135,169 A * | 8/1992 | Mensink | ................ C03B 3/00 239/123 |

FOREIGN PATENT DOCUMENTS

JP    2003-039274 A    2/2003

* cited by examiner

*Primary Examiner* — Steven J Ganey
(74) *Attorney, Agent, or Firm* — Hauptman Ham, LLP

(57) ABSTRACT

A nozzle through which a liquid coolant is discharged is provided with an outer tube, a projecting member and an inner tube disposed inside the outer tube, and an elastic body disposed between the inner tube and a discharge port of the outer tube. If foreign matter accumulates on a nozzle opening of the inner tube, the elastic body is compressed by the inner tube under the pressure of the coolant, so that the inner tube moves toward the discharge port. Consequently, the projecting member penetrates the nozzle opening, thereby automatically removing the foreign matter accumulated on the nozzle opening.

5 Claims, 8 Drawing Sheets

COOLANT NOZZLE HAVING FUNCTION OF AUTOMATICALLY ELIMINATING CLOGGING BY FOREIGN MATTER

RELATED APPLICATIONS

The present application claims priority to Japanese Application Number 2014-204595, filed Oct. 3, 2014, the disclosure of which is hereby incorporated by reference herein in its entirety.

BACKGROUND OF THE INVENTION

Field of the Invention

The present invention relates to a coolant nozzle, and more particularly, to a coolant nozzle having a function of automatically eliminating clogging by foreign matter.

Description of the Related Art

A cutting fluid (coolant) of which lubrication, cooling, and chip removal effects can be expected is used in many cases of cutting work and grinding work using a machine tool. The coolant stored in a dedicated tank or the like reaches a pipe via drive means such as a discharge pump and is then jetted from the tip end of a nozzle on an extension of the pipe toward a cutting point or a cutting tool.

The nozzle for jetting the coolant is generally called a coolant nozzle. The coolant is supplied toward the cutting point or the cutting tool through the coolant nozzle. Foreign matter, such as chips, may be mixed into the coolant during machining. As the coolant containing the foreign matter circulates, the foreign matter accumulates on the coolant nozzle, resulting in a reduction in delivery.

In a coolant supply device described in Japanese Patent Application Laid-Open No. 2003-039274 to overcome this problem, air supply means is internally connected to the middle of a pipe disposed between a coolant nozzle and a pump. In this arrangement, foreign matter with which an opening of the coolant nozzle is about to be clogged can be swiftly discharged out of the nozzle by the force of water produced by air.

Although the delivery can be restored by removing the foreign matter from the opening of the coolant nozzle manually or by a tool, however, maintenance to be performed at regular intervals requires a large number of man-hours. Accumulation of the foreign matter on the nozzle can be suppressed to some extent by providing a filter or the air supply means described in Japanese Patent Application Laid-Open No. 2003-039274. However, this countermeasure additionally requires costs for the installation of the air supply means or maintenance of the filter.

SUMMARY OF THE INVENTION

Accordingly, the object of the present invention is to provide a coolant nozzle through which a liquid coolant is discharged and which is configured to automatically remove deposited foreign matter, if any.

A coolant nozzle according to the present invention comprises an outer tube with a discharge port at the lower end thereof, a projecting member disposed inside the outer tube and set up upstream with respect to a coolant from the discharge port of the outer tube, an inner tube disposed inside the outer tube and comprising a nozzle opening in a position for insertion of the projecting member, and an elastic body disposed between the inner tube and the discharge port of the outer tube. The elastic body is compressed so that the inner tube moves toward the discharge port by a distance corresponding to the compression when the inner tube is pushed by the coolant, whereby a distal end portion of the projecting member projects out of the inner tube through the nozzle opening.

The coolant nozzle may comprise an inner wall disposed inside the outer tube and set up upstream with respect to the coolant from the discharge port, so that the elastic body may be disposed in a space closed by the outer tube, the inner wall, and the inner tube.

The outer tube and the inner tube may be provided individually with indices for indicating the relative positions thereof.

According to the present invention, a device configuration such as air supply means need not be provided around the coolant nozzle, so that accumulation of foreign matter on the discharge port in the coolant nozzle can be suppressed without entailing high costs. Since the nozzle does not require regular maintenance, moreover, the mean time between failures (MTBF) increases.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A first embodiment of a coolant nozzle according to the present invention will first be described with reference to FIGS. 1 to 9.

Figure 1:
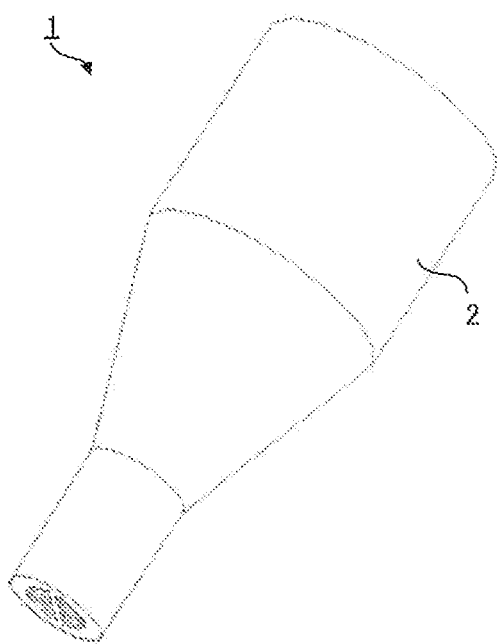
FIG. 1 is an exterior view showing a first embodiment of a coolant nozzle according to the present invention.
Figure 2:
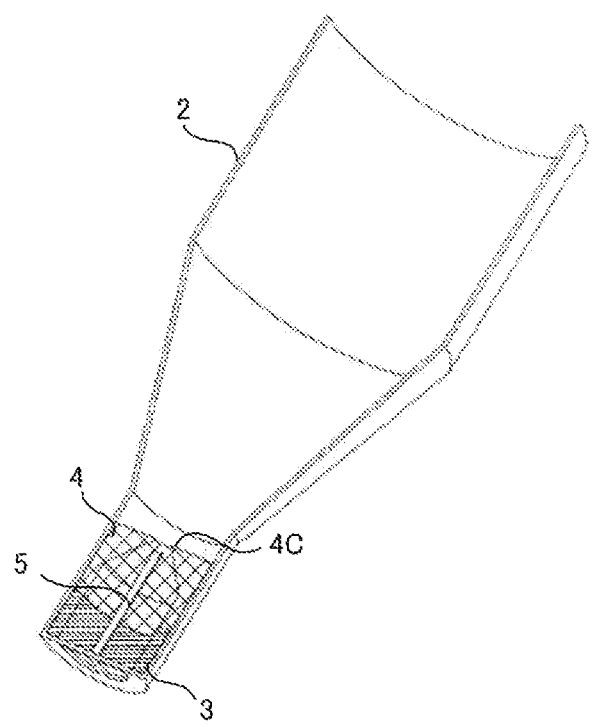
FIG. 2 is a sectional view of the coolant nozzle of FIG. 1.

As shown in FIGS. 1 and 2, a coolant nozzle 1 comprises an outer nozzle (outer tube 2), elastic body 3, inner nozzle (inner tube 4), and projecting member (push rod 5).

Figure 3A:
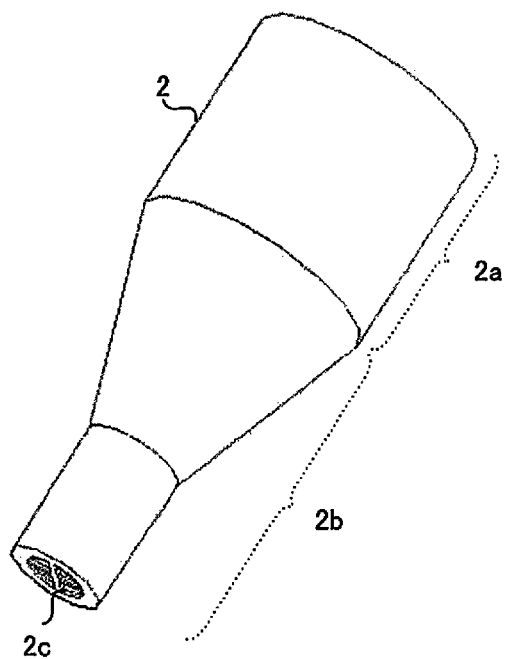
FIG. 3A is a view showing an example of an outer tube of the coolant nozzle of FIG. 1.
Figure 3B:
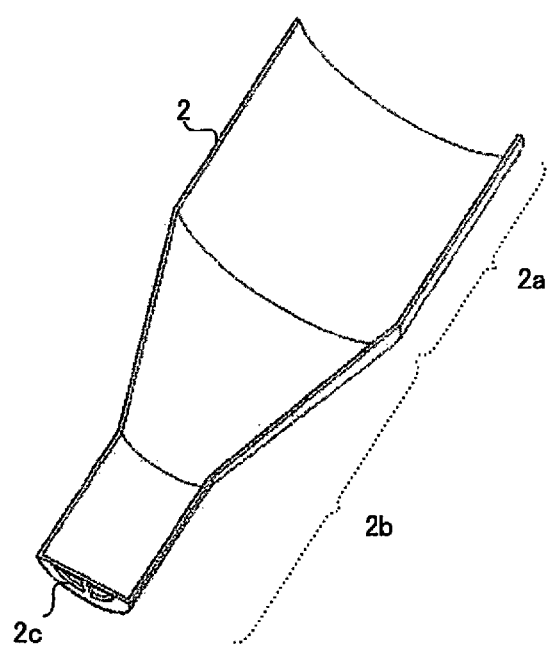
FIG. 3B is a sectional view of the outer tube of FIG. 3A.

As shown in FIGS. 3A and 3B, the outer tube 2 has a shape that combines a cylindrical portion 2a and a funnel-shaped portion 2b. The distal end of the funnel-shaped portion 2b is formed as a discharge port 2c for a coolant. During machining by a machine tool, the coolant stored in a dedicated tank or the like is supplied through a pipe to the cylindrical portion 2a connected to the pipe under pressure from drive means such as a discharge pump. Then, the coolant is passed through the funnel-shaped portion 2b and jetted from the discharge port 2c toward a cutting point or a cutting tool.

Figure 4A:
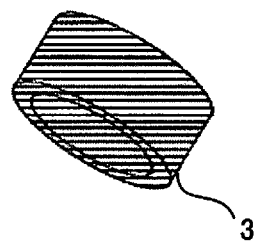
FIG. 4A is a view showing an example of an elastic body attached to the coolant nozzle of FIG. 1.
Figure 4B:
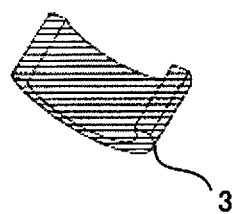
FIG. 4B is a sectional view of the elastic body of FIG. 4A.

The elastic body 3 is formed of an elastic material or member such as rubber and has a cylindrical shape, as shown in FIG. 4A. The elastic body 3 is shaped so that it can be located in the distal end of the funnel-shaped portion 2b of the outer tube 2 of the coolant nozzle 1, as shown in FIG. 2. The elastic body 3 is disposed (bonded) between the inner tube 4 and the inside of the discharge port 2c, in the distal end of the funnel-shaped portion 2b of the outer tube 2, and serves as a cushion member between the inner tube 4 and the inside of the discharge port 2c.

Figure 5A:
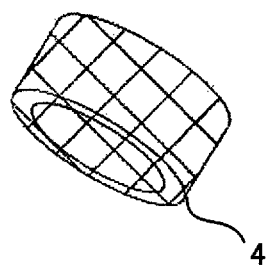
FIG. 5A is a view showing an example of an inner tube attached to the coolant nozzle of FIG. 1.
Figure 5B:
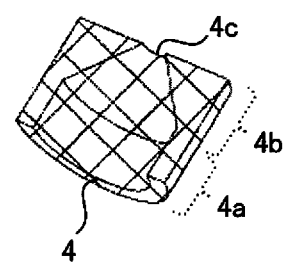
FIG. 5B is a sectional view of the inner tube of FIG. 5A.

The inner tube 4 is made of a metal or a resin with certain rigidity. As shown in FIGS. 5A and 5B, the inner tube 4 has a shape that combines a cylindrical portion 4a and a tapered portion 4b having a funnel-shaped hollow. A nozzle opening 4c is formed at the tip of the tapered portion 4b. As shown in FIG. 2, the inner tube 4 is shaped so that it can be located in the distal end of the funnel-shaped portion 2b of the outer tube 2. The end surface of the cylindrical portion 4a of the inner tube 4 located in the distal end of the funnel-shaped portion 2b is bonded to the end surface of the elastic body 3 located in the distal end of the funnel-shaped portion 2b.

Figure 6:
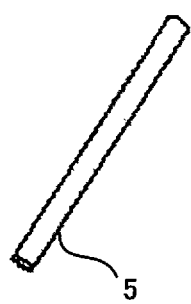
FIG. 6 is a view showing an example of a push rod attached to the coolant nozzle of FIG. 1.

The push rod 5 has a columnar shape, as shown in FIG. 6, and its proximal end is secured to the distal end of the outer tube 2 (inside center of the discharge port 2c) and passed through the elastic body 3 located in the distal end of the funnel-shaped portion 2b of the outer tube 2. The distal end of the push rod 5 extends up to the vicinity of the nozzle opening 4c of the inner tube 4 (but without penetrating the nozzle opening 4c).

Figure 7:
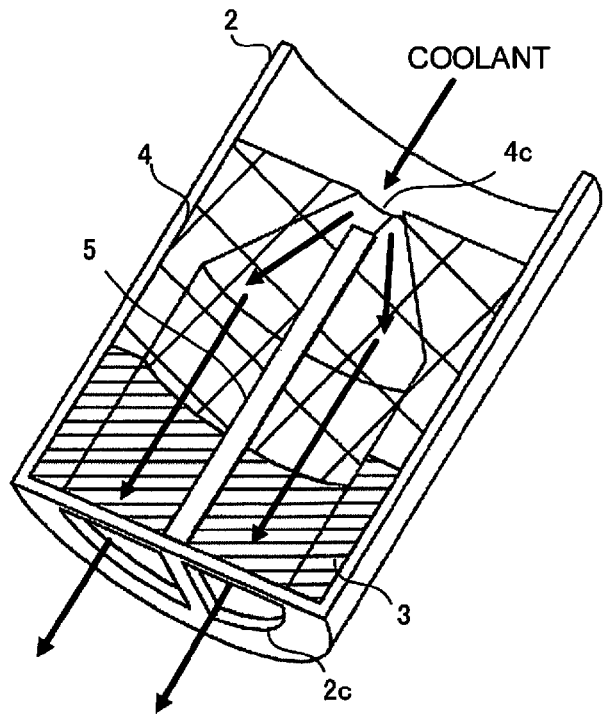
FIG. 7 is a view illustrating a normal flow of a coolant in the coolant nozzle of FIG. 1.
Figure 8:
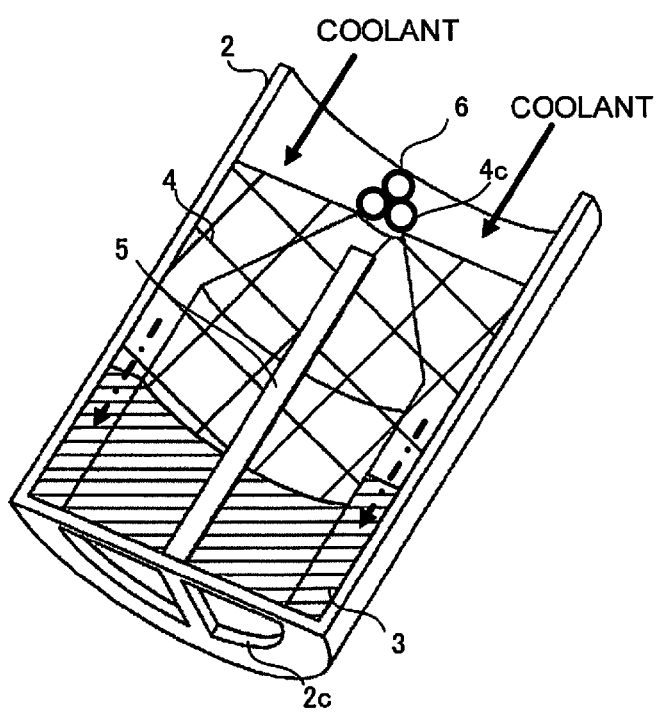
FIG. 8 is a view showing the movement of the coolant in the coolant nozzle of FIG. 1 when foreign matter (e.g., chips) is deposited on a nozzle opening of the inner tube of the nozzle.
Figure 9:
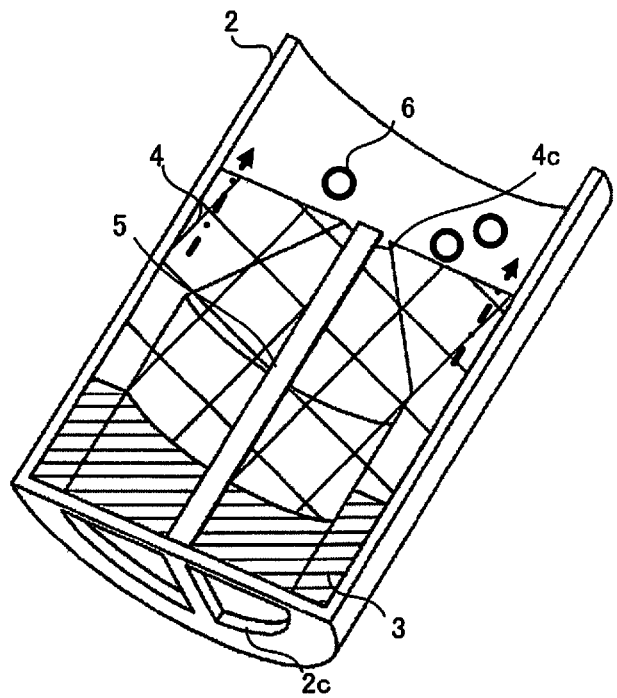
FIG. 9 is a view illustrating an operation for removing the foreign matter deposited on the nozzle opening of FIG. 8 by means of the push rod.

Referring now to FIGS. 7 to 9, there will be described the operations of the members in the coolant nozzle 1 performed when the coolant is jetted by the coolant nozzle 1 constructed as described above.

When the coolant nozzle 1 is in its normal state, that is, if no foreign matter is deposited on the nozzle opening 4c, as shown in FIG. 7, the coolant flows along its flow passages indicated by the arrows in FIG. 7, passes through the nozzle opening 4c of the inner tube 4, the inside of the inner tube 4, and the inside of the elastic body 3, and is discharged through the discharge port 2c of the outer tube 2.

If foreign matter 6 (e.g., chips) is deposited on the nozzle opening 4c of the inner tube 4, as shown in FIG. 8, in contrast, the coolant supplied by the discharge pump cannot pass through the nozzle opening 4c. Thereupon, pressure is produced in the upper part of the inner tube 4 by the coolant. If the pressure from the coolant is applied to the end surface (upper end surface) of the inner tube 4 on the side of the tapered portion 4b, the inner tube 4 is pushed toward the elastic body 3 (in the direction of broken-line arrows). Consequently, the elastic body 3 is pushed toward the discharge port 2c (in the direction of the broken-line arrows) and compressed by the end surface (lower end surface) of the inner tube 4 on the side of the cylindrical portion 4a.

When the elastic body 3 is compressed, the inner tube 4 moves toward the discharge port 2c by a distance corresponding to the compression. Thereupon, the distal end portion of the push rod 5, having its proximal end secured to the inside of the discharge port 2c of the outer tube 2, projects out of the inner tube 4 through the nozzle opening 4c thereof. Thus, the foreign matter 6 deposited on the nozzle opening 4c is pushed away by the distal end of the push rod 5 and removed thereby.

If the foreign matter 6 is removed, the coolant is allowed to pass through the nozzle opening 4c, so that its pressure on the inner tube 4 is reduced. Consequently, the inner tube 4 is pressed by the repulsive force of the elastic body 3, moved thereby in the direction of the broken-line arrows, and restored to its original shape. Thus, the supply of the coolant through the nozzle opening 4c can be continued thereafter.

Since the coolant nozzle 1 is thus provided with means for automatically removing deposited foreign matter, if any, it is not necessary to provide any special device or structure for removing foreign matter, and the cost of maintenance such as regular cleaning can be reduced.

Figure 10:
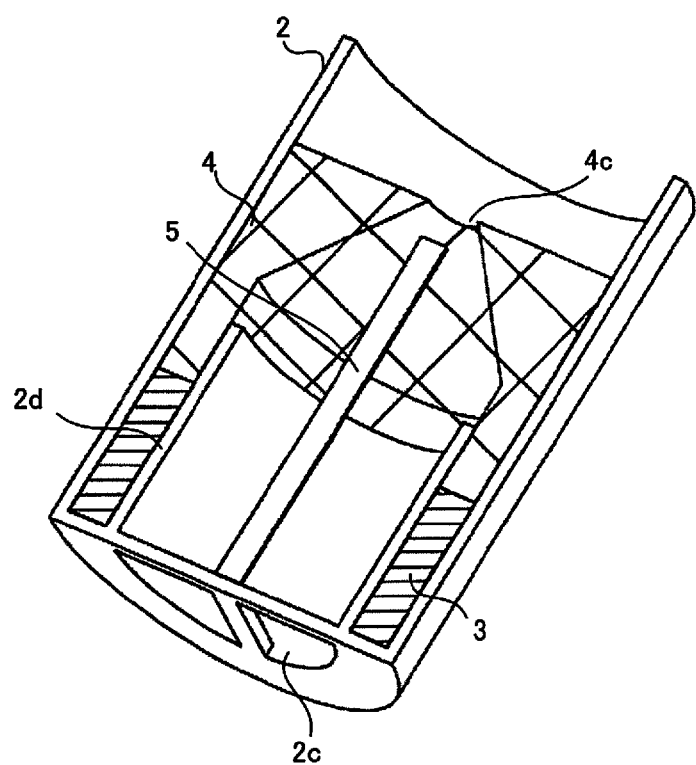
FIG. 10 is a sectional view of the distal end portion of an outer tube of a second embodiment of the coolant nozzle according to the present invention.

A second embodiment of the coolant nozzle according to the present invention will now be described with reference to FIG. 10.

In the coolant nozzle according to the first embodiment, the elastic body 3 is disposed so as to be exposed to the interior of the coolant nozzle through the nozzle opening 4c. In this embodiment, however, an inner wall 2d is provided inside an outer tube 2 so as to surround a discharge port 2c, and an elastic body 3 is disposed in a closed space surrounded by the outer tube 2, the inner wall 2d, and the lower end surface of an inner tube 4.

With this configuration, a coolant or foreign matter can be prevented from getting into the space around the elastic body 3, so that degradation and malfunctioning of the elastic body 3 can be avoided.

A third embodiment of the coolant nozzle according to the present invention will now be described with reference to FIG. 11.

In this embodiment, a component of a nozzle 1 is provided with a mark in a position representative of a state in which a coolant is normally discharged. Based on the mark position, an operator is informed of clogging of foreign matter 6 and a change of the flow rate of the coolant.

Figure 11A:
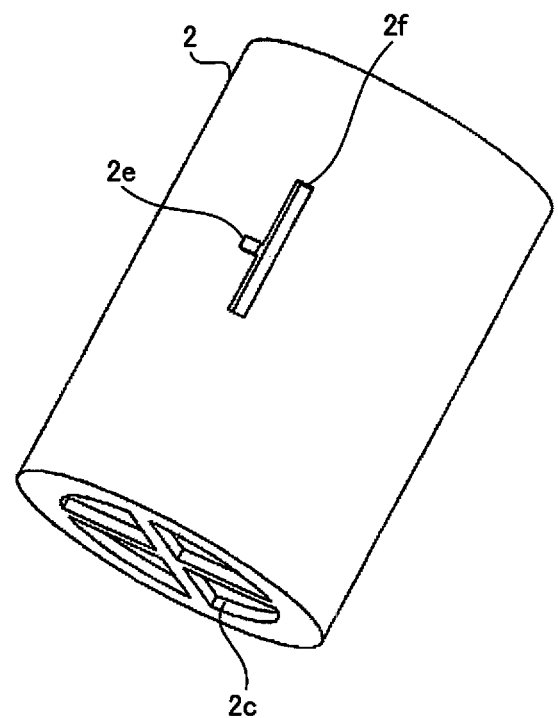
FIG. 11A is an exterior view of the distal end portion of an outer tube of a third embodiment of the coolant nozzle according to the present invention.
Figure 11B:
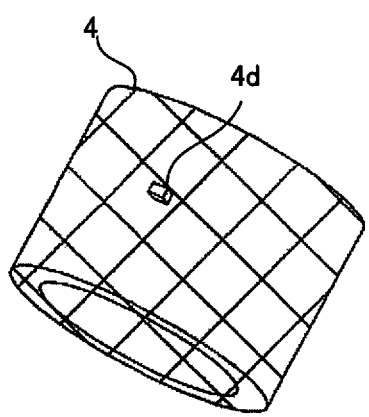
FIG. 11B is an exterior view of the inner tube disposed in the distal end portion of the outer tube of FIG. 11A.

To attain this, as shown in FIG. 11, the distal end portion of an outer tube 2 is provided with a first mark 2e and a slit 2f, which is disposed near the first mark 2e and extends long in the direction of movement of an inner tube 4 in the outer tube 2. On the other hand, the inner tube 4 located in the distal end portion of the outer tube 2 is provided with a second mark 4d in a position in which the slit 2f in the distal end portion of the outer tube 2 is passed.

Figure 12:
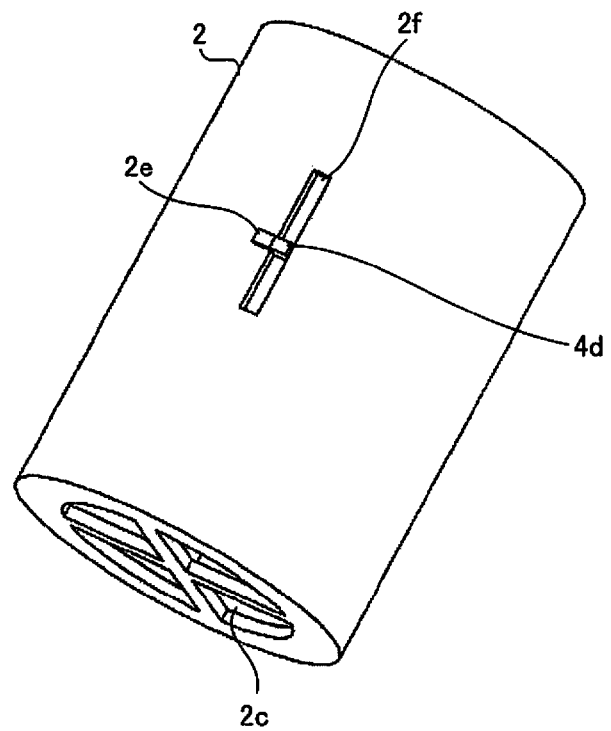
FIG. 12 is a view showing the external appearance of the distal end portion of the outer tube of the third embodiment of the coolant nozzle according to the present invention in a normal state.

As shown in FIG. 12, the first mark 2e attached to the distal end portion of the outer tube 2 and the second mark 4d on the inner tube 4 are aligned with each other in the longitudinal direction of the slit 2f while the coolant is being normally discharged, that is, while an elastic body 3 is being compressed to some extent by the normal coolant pressure so that the inner tube 4 is slightly moved toward a discharge port 2c.

Since the outer surface of the inner tube 4 is always in close contact with the inside of that part of the outer tube 2 in which the slit 2f is formed (that is, the position and size of the slit 2f are matched to the location and size of the inner tube 4), the coolant in the coolant nozzle 1 never leaks through the slit 2f.

Figure 13:
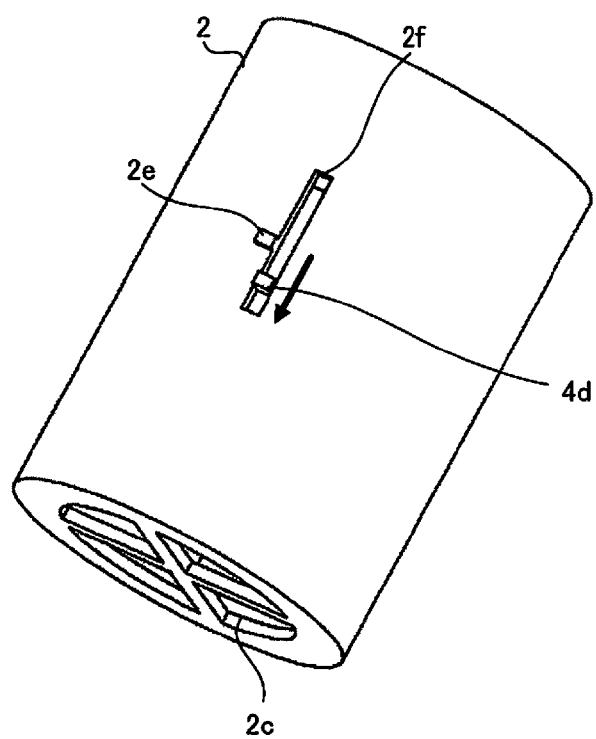
FIG. 13 is a view showing the external appearance of the distal end portion of the outer tube of the third embodiment of the coolant nozzle according to the present invention in a state in which foreign matter is deposited on a nozzle opening.

If a nozzle opening 4c of the inner tube 4 is clogged with foreign matter, in the coolant nozzle 1 constructed in this manner, the inner tube 4 is pushed in and moved toward the discharge port 2c, as described with reference to FIG. 8 (first embodiment). Consequently, the second mark 4d is deviated in the direction of the arrow in FIG. 13, so that the operator can perceive the clogging by the foreign matter by identifying the misalignment between the first mark 2e on the distal end portion of the outer tube 2 and the second mark 4d on the inner tube 4.

Even if malfunctioning occurs due to any cause or before the foreign matter accumulates to such an extent as to reduce the flow rate, moreover, the foreign matter 6 on the nozzle opening 4c can be removed by manually pinching the second mark 4d and moving the inner tube 4 in the direction of the arrow to force the distal end portion of the push rod 5 to project outward through the nozzle opening 4c.

Figure 14A:
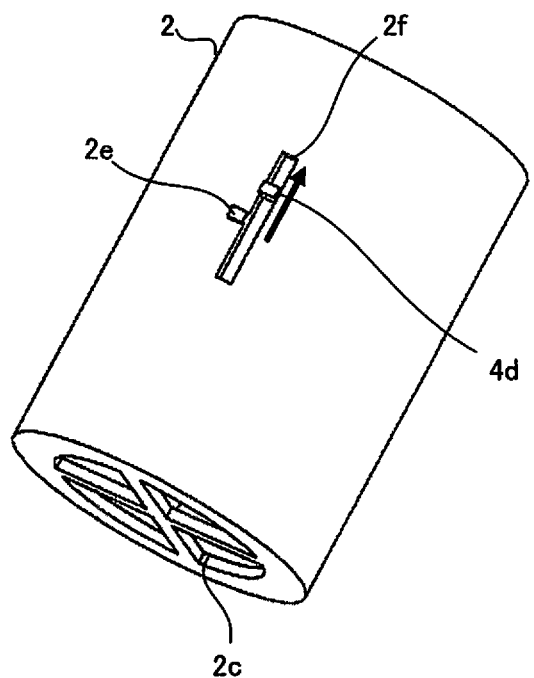
FIG. 14A is a view showing the external appearance of the distal end portion of the outer tube of the third embodiment of the coolant nozzle according to the present invention in an abnormal state of coolant flow.
Figure 14B:
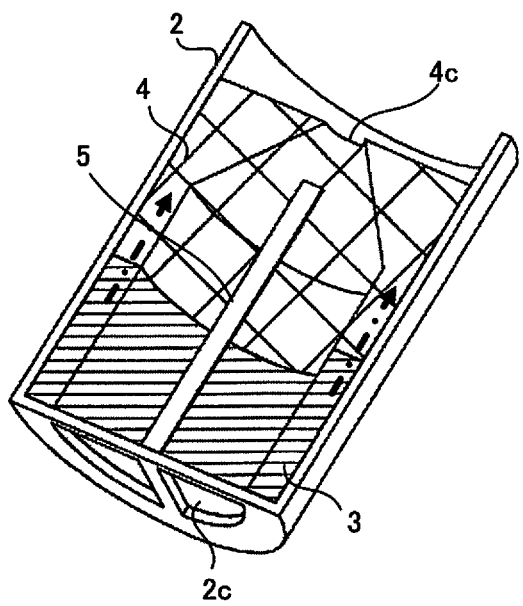
FIG. 14B is a sectional view showing the internal state of the distal end portion of the outer tube of the third embodiment of the coolant nozzle according to the present invention in the abnormal state of coolant flow.

If the flow rate of the coolant supplied to the coolant nozzle 1 is reduced due to a failure in the discharge pump or the pipe, furthermore, the coolant pressure is reduced so that the inner tube 4 is pushed back in the direction of the broken-line arrow in FIG. 14B, and the second mark 4d is deviated relative to the first mark 2e in the direction of the arrow in FIG. 14A. Therefore, the operator can perceive an abnormal state of coolant supply to the coolant nozzle 1 by identifying the misalignment between the first and second marks 2e and 4d. Thus, some measures can be taken before the flow rate is reduced to such a low value as to adversely affect the machining.

While certain embodiments have been described herein, the present invention is not limited to these embodiments and can also be carried out in other embodiments based on appropriate modifications. In the embodiments described above, for example, the outer tube 2, elastic body 3, and inner tube 4 are each in the form of a body of revolution. However, the scope of the present invention is not limited to these embodiments, and each of those elements may alternatively be formed in a cuboid or asymmetric shape without a problem. Further, the push rod 5 is not limited to the shape of a body of revolution and may alternatively be formed in a cuboid (plate-like) or asymmetric shape or the shape of a rod member having a cross- or star-shaped cross-section. Preferably in this case, the respective shapes of the nozzle opening 4c of the inner tube 4 and the push rod 5 should be matched to each other. The inner tube 4 may be provided with a plurality of nozzle openings 4c. In this case, it is necessary only that a plurality of push rods 5 be provided corresponding to the number and position of the nozzle openings 4c.

In the above-described embodiments, moreover, rubber is given as an example of the elastic body 3 as a component of the coolant nozzle 1. However, sponge or the like may be used instead provided it has elasticity. Alternatively, furthermore, a spring or other member that has structural elasticity may be used. Although the elastic body 3 is disposed in close contact with the outer tube 2 in the drawings illustrating the above embodiments, it need not always be in close contact with the outer tube 2. Further, the elastic body 3 need not always be annular and may be of any shape only if it can be located in the outer tube 2 so that it serves as a balanced cushion member between the discharge port 2c and the inner tube 4. For example, the elastic body 3 may be formed of a plurality of plate-like elastic members arranged at substantially equal intervals inside the discharge port 2c.

In the embodiments described above, furthermore, both the outer and inner tubes 2 and 4 are provided with their own marks. However, the marks may be arranged in any manner provided that the outer tube 2 is formed of a transparent material and the marks are located in boundary positions between the inner tube 4 and the elastic body 3 (when the outer tube 2 is viewed from the outside) so that the operator can visually recognize the relative positions of the outer tube 2 and the inner tube 4.

The invention claimed is:

1. A coolant nozzle through which a liquid coolant is discharged, the coolant nozzle comprising:
    an outer tube with a discharge port at a lower end thereof;
    a projecting member disposed inside the outer tube and set up upstream with respect to the coolant from the discharge port of the outer tube;
    an inner tube disposed inside the outer tube and comprising a nozzle opening in a position for insertion of the projecting member; and
    an elastic body disposed between the inner tube and the discharge port of the outer tube,
    wherein the elastic body is compressed so that the inner tube moves toward the discharge port by a distance corresponding to the compression when the inner tube is pushed by the coolant, whereby a distal end portion of the projecting member projects out of the inner tube through the nozzle opening.

2. The coolant nozzle according to claim 1, further comprising an inner wall disposed inside the outer tube and set up upstream with respect to the coolant from the discharge port, wherein the elastic body is disposed in a space closed by the outer tube, the inner wall, and the inner tube.

3. The coolant nozzle according to claim 1, wherein the outer tube and the inner tube are provided individually with indices for indicating the relative positions thereof.

4. A coolant device comprising the coolant nozzle according to claim 1.

5. A machine tool comprising the coolant device according to claim 4.

* * * * *